US 6,643,071 B2

(12) United States Patent
Schnitzer

(10) Patent No.: US 6,643,071 B2
(45) Date of Patent: Nov. 4, 2003

(54) GRADED-INDEX LENS MICROSCOPES

(75) Inventor: Mark J Schnitzer, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/029,576

(22) Filed: Dec. 21, 2001

(65) Prior Publication Data

US 2003/0117715 A1 Jun. 26, 2003

(51) Int. Cl.$^7$ .............................. G02B 3/00; G02B 21/00
(52) U.S. Cl. ...................... 359/653; 359/652; 359/654; 359/368
(58) Field of Search ................................ 359/362–398, 359/652–654, 368, 380

(56) References Cited

U.S. PATENT DOCUMENTS

| | | | | |
|---|---|---|---|---|
| 3,655,259 A | * | 4/1972 | Miyauchi et al. | 359/376 |
| 4,515,444 A | | 5/1985 | Prescott et al. | 350/413 |
| 4,723,843 A | | 2/1988 | Zobel | 350/573 |
| 4,880,298 A | * | 11/1989 | Takada | 359/654 |
| 5,034,613 A | | 7/1991 | Denk et al. | 250/458 |
| 5,361,166 A | | 11/1994 | Atkinson et al. | 359/654 |
| 5,377,047 A | * | 12/1994 | Broome et al. | 359/654 |
| 5,548,113 A | * | 8/1996 | Goldberg et al. | 359/368 |
| 5,804,813 A | | 9/1998 | Wang et al. | 250/201.3 |
| 6,166,385 A | | 12/2000 | Webb et al. | 250/458.1 |
| 6,341,036 B1 | | 1/2002 | Tearney et al. | 359/368 |

FOREIGN PATENT DOCUMENTS

| | | | | |
|---|---|---|---|---|
| DE | 199 27 724 A1 | 1/2000 | | G02B/21/00 |
| WO | WO 94/07142 | 3/1994 | | G01N/33/58 |
| WO | WO 98/38907 | 9/1998 | | A61B/5/00 |
| WO | WO 99/44089 | 9/1999 | | G02B/21/00 |
| WO | WO 01/59423 A2 | 8/2001 | | |
| WO | WO 02/48688 A1 | 6/2002 | | G01N/21/49 |

OTHER PUBLICATIONS

U.S. patent application Ser. No. 09/919,017, Reed et al., filed Jul. 31, 2001.
"Research Reduces Cost of Endoscopes," Optics and Laser Technology, Elsevier Science Publishers BV., Amsterdam, NL, vol. 25, No. 6, Dec. 1, 1993, p. 400.
U.S. patent application Ser. No. 10/082,870, Schnitzer, filed Feb. 25, 2002.

* cited by examiner

Primary Examiner—Loha Ben
Assistant Examiner—M. Hasan
(74) Attorney, Agent, or Firm—John F. McCabe

(57) ABSTRACT

An optical microscope includes a compound GRIN objective and a lens system. The compound GRIN objective is able to form an image of an object located near one end of the GRIN objective. The compound GRIN objective is configured to limit a lateral field of view for the image to a distance equal to the diameter of the GRIN objective. The lens system is positioned to form a magnified image of an image formed by the compound GRIN objective.

20 Claims, 4 Drawing Sheets

GRADED-INDEX LENS MICROSCOPES

BACKGROUND OF THE INVENTION

1. Field of the Invention

This invention relates to optical microscopes.

2. Discussion of the Related Art

One important tool for biological research and medical diagnostics is the optical microscope. FIG. 1 shows a conventional optical microscope 10. The optical microscope 10 includes an objective lens 12 and an imaging lens 14, i.e., an eyepiece. Exemplary microscopes include objective and imaging lenses 12, 14 that are compound lenses or lens systems.

Both objective and imaging lenses 12, 14 contribute to image magnification. The objective lens 12 forms a first magnified image 16 of an object 18 being examined. The first image 16 becomes the object for the imaging lens 14, which produces a further magnified final image 20. Here, the final image 20 is virtual and observed by an observer's eye 22. The total image magnification is the product of the separate magnifications produced by the objective lens 12 and the imaging lens 14.

Use of an optical microscope to examine internal tissues of a large animal typically entails removing the tissues from the animal. The removal facilitates positioning the microscope's objective lens for viewing the tissues. Thus, microscopic examination is typically performed in-vitro, i.e., outside the animal's body.

SUMMARY OF THE INVENTION

Various embodiments provide optical microscopes useable for in-vivo examinations of biological tissues and other samples.

In one aspect, the invention features an optical microscope that includes a compound GRIN objective and a lens system. The compound GRIN objective is able to form an image of an object that is located near one end of the GRIN objective. The compound GRIN objective is configured to limit the lateral field of view for imaging to a distance equal to the diameter of the GRIN objective. The lens system is positioned to form a magnified image of the image formed by the compound GRIN objective.

In another aspect, the invention features an optical microscope that includes a lens system and a GRIN objective. The GRIN objective is positioned to produce an image that the lens system is capable of magnifying. The GRIN objective includes a first and second GRIN lenses, which are end-coupled. The first and second GRIN lenses have respective pitches $P_1$ and $P_2$, and $P_2$ is greater than $P_1$. The first GRIN lens has a length that belongs to the interval $(0, \frac{1}{4}P_1]$ modulo a whole- or half-integer times $P_1$.

DETAILED DESCRIPTION OF ILLUSTRATIVE EMBODIMENTS

Herein, graded index (GRIN) refers to a refractive index grading with respect to radial distance from a central axis of a lens or an optical fiber. Exemplary GRIN include index gradings with quadratic dependencies on the radial distance and index gradings with quadratic and higher order dependencies on the radial distance. Refractive index gradings that reduce image distortions and/or lens aberrations are known to those of skill in the art.

Figure 1:
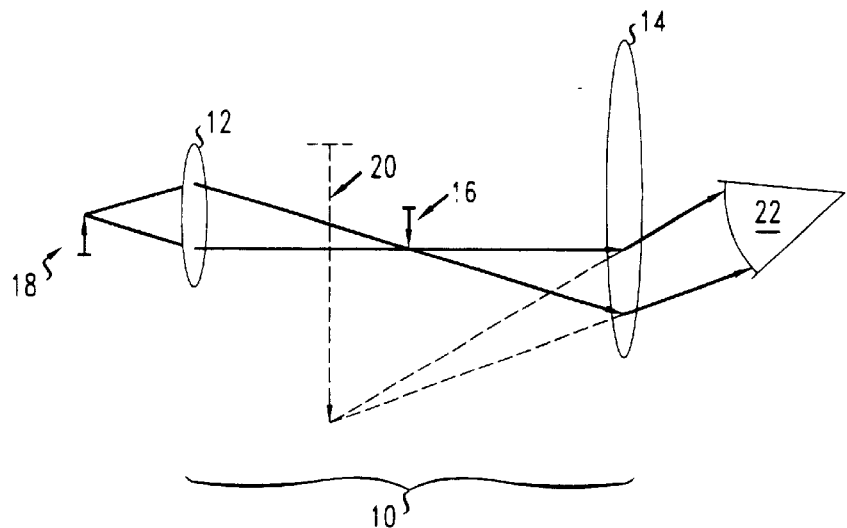
FIG. 1 illustrates a conventional optical microscope.
Figure 2:
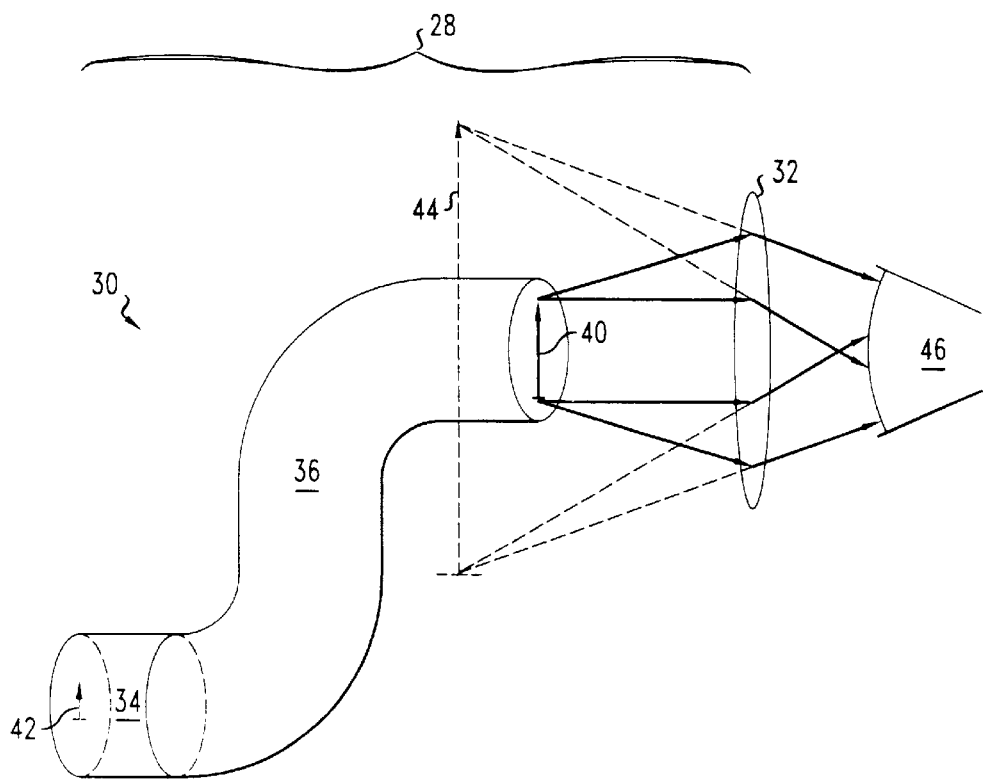
FIG. 2 illustrates an embodiment of an optical microscope with a compound graded index (GRIN) objective.

FIG. 2 illustrates an optical microscope 28 that has a compound GRIN objective 30 and an imaging lens system 32. The compound GRIN objective 30 includes end-fused first and second GRIN lenses 34, 36. The GRIN lenses 34, 36 are circular cross-section GRIN rods, clad GRIN optical fibers, or unclad GRIN optical fibers. The first and second GRIN lenses 34, 36 have respective pitches $P_1$ and $P_2$, and $P_1 < P_2$. The first GRIN lens 34 has a length of about $(\frac{1}{4}-\Delta)P_1$ modulo a whole- or half-integer times $P_1$, i.e., the length is $(\frac{1}{4}-\Delta)P_1 + \frac{1}{2}NP_1$ where N is a non-negative integer. Here, $\Delta$ is a number belonging to the interval $[0, \frac{1}{4})$. The second GRIN lens 36 has a length of about $\frac{1}{4}P_2$ modulo a whole- or a half-integer times $P_2$, i.e., the length is $\frac{1}{4}P_2 + \frac{1}{2}MP_2$ where M is a non-negative integer. The length of GRIN lens 36 is preferably $\frac{3}{4}P_2$. The imaging lens system 32 includes one or more spherical lenses.

Herein, a spherical lens refers to any system of one or more lenses that uses curved surfaces to refract light.

FIG. 2 illustrates how optical microscope 28 forms an image 44 of an object 42 located near a first face of the compound GRIN objective 30. The compound GRIN objective 30 forms a real focused image 40 of the object 42 on its second face, which is polished. The real focused image 40 is an object for imaging lens 32. Imaging lens 32 forms a further magnified image 44 of the real focused image 40. The final image 44 is virtual and viewed through the imaging lens 32 by an observer's eye 46.

The field of view of GRIN objective 30 is limited both laterally and in depth, e.g., by the selected lengths of simple GRIN lenses 34, 36. Laterally, the field of view for focused images, at least, is limited to off-axis distances that are, at least, not greater than the diameter of the GRIN objective 30. In depth, the field of view is limited to points near a face of the GRIN objective 30. The depth of the field of view includes objects that are, to first approximation, a distance of the order of $(\Delta P_1)/n$ from the free face of the first GRIN lens 34, where n is the ratio of the refractive index of the sample medium to that of the GRIN lens 34. For cellular biological applications, $\Delta P_1$ is selected so that this distance is between about 5 microns ($\mu$) and about 2000 $\mu$.

By limiting the field of view, the design of GRIN objective 30 produces images that have high resolution and are free of significant geometric distortion. The design produces image resolutions that are approximately equal to the diffraction-defined resolution limit. Exemplary lateral resolutions are less than 1 $\mu$ on -axis.

In other embodiments (not shown), imaging lens 32 is positioned to form a real image of object 42. The real images form on a fluorescent screen, a photographic film, or a detection surface of an electronic camera (all not shown).

In the optical microscope 28, the final image magnification is a product of magnifications produced by the compound GRIN objective 30 and the imaging lens 32. In exemplary embodiments, both the compound GRIN objective 30 and the imaging lens 32 produce image magnifications greater than one.

Figure 3:
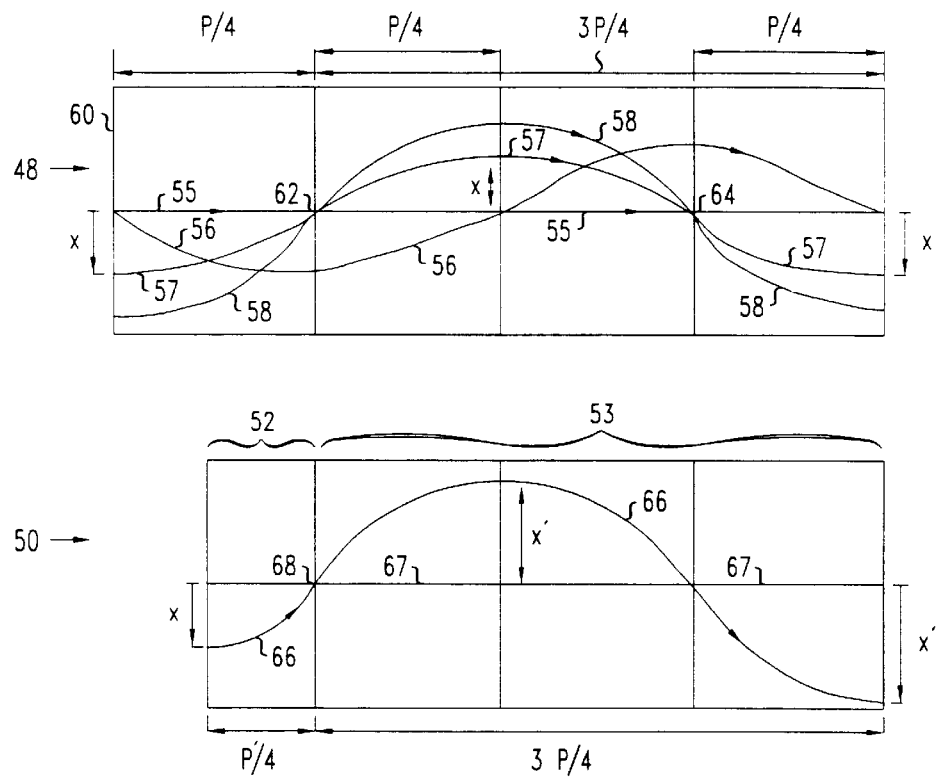
FIG. 3 illustrates propagation of light rays in simple and compound GRIN lenses.

FIG. 3 shows a simple and compound GRIN lenses 48, 50 and illustrates how the compound GRIN lens 50 is able to produce image magnification. The simple GRIN lens 48 has pitch, P, and a length of about P. The pitch of a GRIN lens is twice the distance between adjacent points where a light ray crosses the lens' central axis. The compound GRIN lens 50 includes first and second GRIN lens segments 52, 53 with respective pitches P' and P where P>P'. The first and second GRIN lens segments 52, 53 have respective lengths of ¼P' and ¾P. The second GRIN lens segment 53 of the compound GRIN lens 50 is side-by-side aligned with a segment of equal length and pitch of the simple GRIN lens 48 so that ray propagation can be compared in the two GRIN lenses 48, 50.

FIG. 3 shows several light rays 55–58 propagating in simple GRIN lens 48. The light ray 55 starts on the lens' central axis and is directed along the central axis. Thus, the light ray 55 propagates along the central axis without undergoing angular deviation. The light ray 56 starts on the lens' central axis and makes a nonzero starting angle with the central axis. Thus, the light ray 56 is refracted along a sinusoidal path in the GRIN lens 48. The path crosses the lens' central axis at ½—pitch distances, i.e., P/2 and P from its starting point on the central axis. The light rays 57, 58 start off the lens' central axis and are initially directed parallel to the lens' central axis. Thus, the light rays 57, 58 are initially at maximal off-axis positions. Such light rays 57, 58 will initially cross the central axis at a point 62 at a ¼—pitch distance from end 60 of the simple GRIN lens 48. The light rays 57, 58 have another crossing point 64 that is separating from the crossing point 62 by a ½—pitch distance.

At each crossing point 62, 64, the light ray 58 that was initially further from the central axis makes a larger angle with that axis than the light ray 57 that was initially closer to the central axis. The light ray 58 has larger crossing angles, because the light ray 58 must undergo more refraction than the initially closer light ray 57 to cross the central axis at the same crossing point 62, 64.

FIG. 3 also shows a light ray 66 that propagates in compound GRIN lens 50. The light ray 66, starts at a distance, x, from the lens' central axis 67 and is initially parallel to the central axis 67. Due to its orientation with respect to the central axis 67, the light ray 66 is initially at a maximal off-axis distance from the central axis 67. Thus, the light ray 66 crosses the central axis 67 after propagating to the opposite end of ¼—pitch GRIN lens segment 52.

Since P'<P, light ray 66 undergoes more refraction prior to crossing central axis 67 of GRIN lens segment 52 than light ray 57 undergoes prior to first crossing the central axis of GRIN lens 48. Thus, the light ray 66 makes a larger crossing angle at point 68 than the light ray 57 makes with at point 62 even though both light rays initially started at the same distance, i.e., x, from the central axes of their respective GRIN lenses 48, 50. Due to the larger axis crossing angle, the light ray 66 attains a larger maximum off-axis distance, x', in the second GRIN lens segment 53 than is attained by the light ray 57 in the corresponding segment of the GRIN lens 48.

The ratio of x'/x is the total magnification of compound GRIN lens 50. If x, x'<<1, the total magnification is approximately equal to P/P'. Thus, compound GRIN objective 30 of FIG. 2 produces a magnification greater than one for $P_2/P_1>1$.

Figure 4:
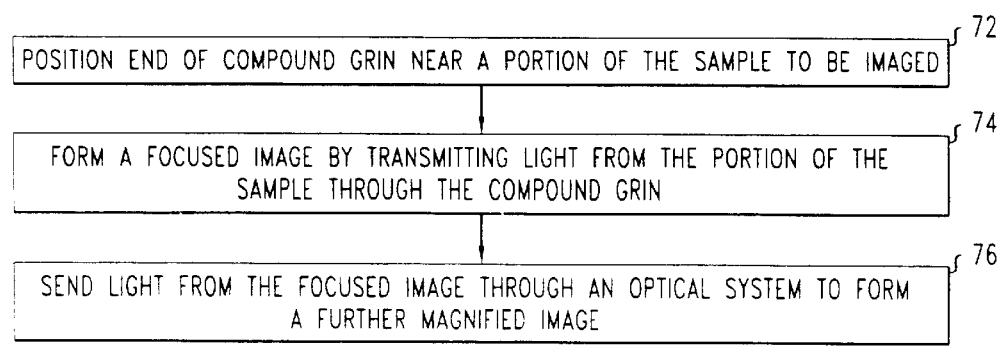
FIG. 4 is a flowchart for a method of operating an optical microscope with a compound GRIN objective.

FIG. 4 illustrates a method 70 of operating an optical microscope with a compound GRIN objective, e.g., optical microscope 30 of FIG. 2. The method 70 includes positioning one end of the compound GRIN objective near the portion of the sample to be imaged (step 72). An exemplary GRIN objective is a biological endoscope whose diameter is between about 1 millimeter and about 250 $\mu$. An end of such an endoscope is positioned near the portion of the sample to be imaged through an invasive endoscopic procedure.

The method 70 also includes forming a focused first image by transmitting light from the portion of the sample to be imaged through the GRIN objective (step 74). In exemplary embodiments, the focused first image forms on a polished face of the GRIN objective when the sample is illuminated with visible or near-infrared light. The portion of the sample produces light transmitted to the GRIN objective via scattering, reflection, or fluorescence processes. The method 70 also includes sending light from the focused first image through an optical imaging system to form a further magnified image of the portion of the sample being imaged (step 76). An exemplary further magnified image is virtual image 44 shown in FIG. 2.

Figure 5:
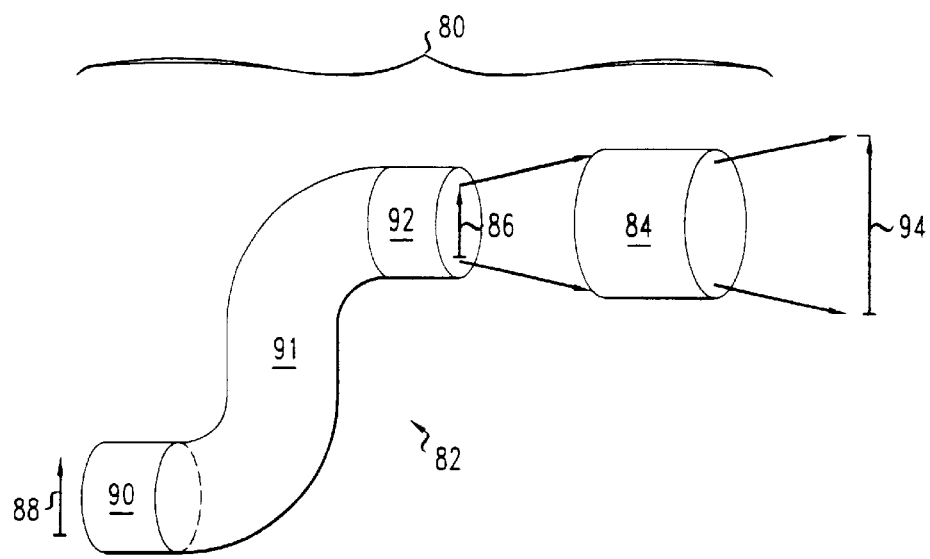
FIG. 5 illustrates an alternate embodiment of an optical microscope with a compound GRIN objective.

FIG. 5 shows an alternate embodiment of an optical microscope 80. The optical microscope 80 includes a compound GRIN objective 82 and a standard optical microscope 84. The compound GRIN objective 82 forms an unmagnified image 86 of object 88 on a polished end-surface of the compound GRIN objective 82. The unmagnified image 86 functions as an object for the standard optical microscope 84. The standard optical microscope produces a magnified image 94 of the object 88, i.e., either a real or a virtual magnified image.

In the optical microscope 80, compound GRIN objective 82 produces a focused image 86 of object 88 in a location more convenient for viewing by standard microscope 84. The object 88 to be imaged is located in a laterally and depth limited a field of view of the compound GRIN objective 82. The limitation on the field of view causes the image of object 88 to be free of significant geometric distortion. An exemplary compound GRIN objective 82 is a thin endoscope that is insertable into a living specimen, e.g., via an invasive or a non-invasive procedure. Using such an exemplary GRIN objective 82 enables in-vivo imaging of living tissues through the standard microscope 84.

The compound GRIN objective 82 includes serially fused first, second, and third GRIN lenses 90–92. The first, second, and third GRIN lenses 90–92 are either GRIN rods or GRIN fibers and have respective pitches P', P, and P'''. Exemplary first, second, and third GRIN lenses 90–92 have respective lengths (¼–Δ)P'+½NP', ½P+½MP, and ¼P'''+½QP''' where N, M, and Q are non-negative integers. Also, P', P'''<<P. Exemplary P'=P''' and are preferably about 5–50 times smaller than P.

Compound GRIN lens 82 functions as a light tube that produces focused images of objects located in a narrow focusing range. The narrow range allows the formation of focused images of objects located near a face of the compound GRIN objective 82, and the narrowness of the range is due to the short pitch of end GRIN lenses 90, 92. The object 88 typically must be within at a distance of about P'Δ from the end of the compound GRIN objective 82, and the sharp focusing range is equal to about $\lambda(P'/nD)^2$ where $\lambda$ is the wavelength of the light used and D is the diameter of the GRIN lens 82. Without the short pitch of the end GRIN lenses 90, 92, the sharp focusing range would be much larger, i.e.i, about 2 to about 400 times that for the larger pitch, P, of GRIN lens 91. Short pitch end GRIN lenses enable forming focused images with a compound GRIN lenses.

Exemplary GRIN lenses 91 have long pitches and thus, long lengths. The long lengths produce compound GRIN objectives 82 that are useful as endoscopes. For in-vivo cellular biological applications, P is preferably in the range of about 0.02 meters to about 5.0 meters, and P' and P''' are preferably about 400 $\mu$ or less.

Figure 6:
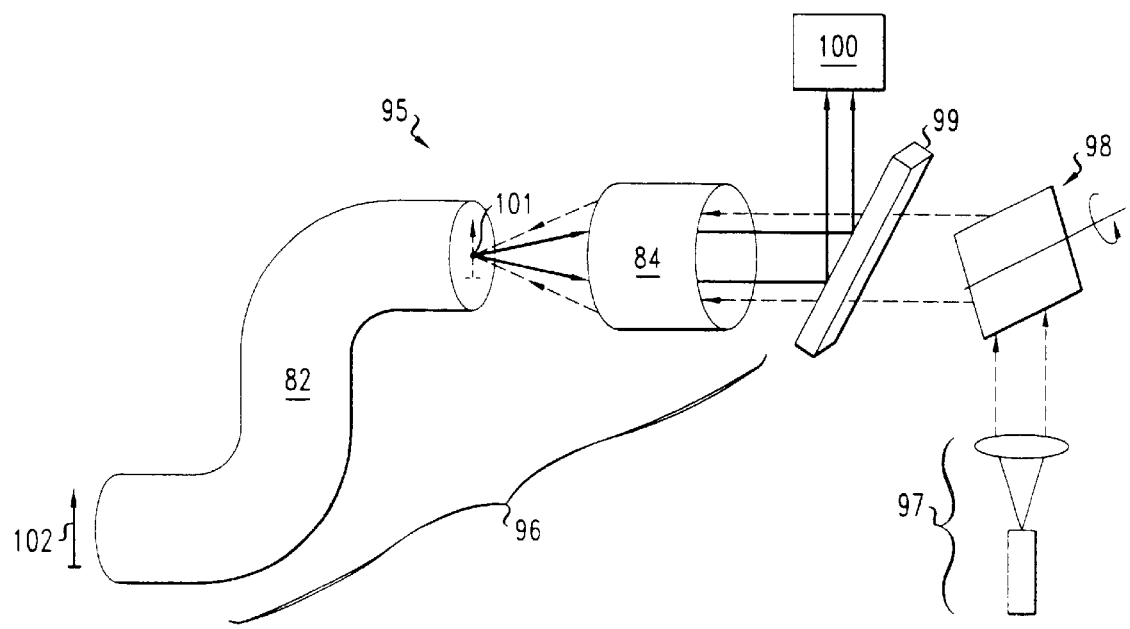
FIG. 6 illustrates an embodiment of an optical scanner based on the optical microscope of FIG. 5.

FIG. 6 shows an optical scanner 95 based on an optical microscope 96 similar to that of FIG. 5. The optical scanner 95 includes optical microscope 96, collimated light source 97, rotatable deflector 98, dichroic mirror 99, and optical intensity detector 100. The light source 97 produces a light beam. The optical microscope 84 focuses the light beam to a scan point 101 located on a face of GRIN objective 82.

Preferably, the numerical aperture of GRIN lens 92 is greater than or equal to the numerical aperture of the beam emitted by microscope 84. For such a relationship between numerical apertures, light from microscope 84 is accepted into compound GRIN objective 82 rather than being partially wasted. Since GRIN lens 91 has a long pitch, the numerical aperture of GRIN lens 91 is low and would usually not satisfy the above-described relationship. In contrast, lens 92 has a much shorter pitch and thus, a much higher numerical aperture, e.g. up to about 0.6. Thus, GRIN lens 92 satisfies the relationship for many standard types of microscope 84.

Adjusting the angle of deflector 98 causes the scan point 101 to move over, i.e., to scan, the end-face of the GRIN objective 82 in a one- or two-dimensional scan pattern. In some embodiments, the deflector 98 includes two individual deflectors, each capable of rotating along one axis. In these embodiments, a two-dimensional scan of the object 88 involves coordinated movements of the two deflectors, each deflector affecting movement of the focal light spot along one dimension. One such deflector includes two orthogonally oriented galvanometer mirrors or two resonant scanners that allow rapid two-dimensional scans. In other embodiments, deflector 98 includes moving reflectors or acousto- or electro-optical deflectors. The GRIN objective 82 transmits light from the scan point 101 to an object 102 to be scanned.

In response to being scanned, a point on the object 12 reflects, scatters, or re-emits light towards the GRIN objective 82. Exemplary re-emission processes include fluorescence, phosphorescence, harmonic generation, and others known to those of skill in the art. The GRIN objective 82 transmits a collected portion of the reflected, scattered or re-emitted light to microscope 84, which then sends the light to dichroic mirror 99. The dichroic mirror 99 redirects the collected portion of the light to intensity detector 100. The intensity detector 100 reconstructs a scan image from measured intensities of the collected portion of the light. The dichroic mirror 99 also transmits source light so that light from reflector 98 is directed to the microscope 84.

In the optical scanning system 95, the GRIN objective 82 enables production of scanned images of viewing fields that would be otherwise difficult to scan. Exemplary viewing fields include internal tissues of large animals such as man. For scanning such viewing fields, an exemplary GRIN objective 82 is a thin optical endoscope that is based on a flexible compound GRIN fiber. Such an optical endoscope is particularly useful, because it enables scanning to be performed remotely, i.e., by scanning a beam along the face of lens 92. This enables scanned imaging modalities such as confocal microscopy, multi-photon microscopy, third-harmonic generation microscopy, and coherent anti-Stokes Raman microscopy to be performed in an endoscopic manner.

Figure 7:
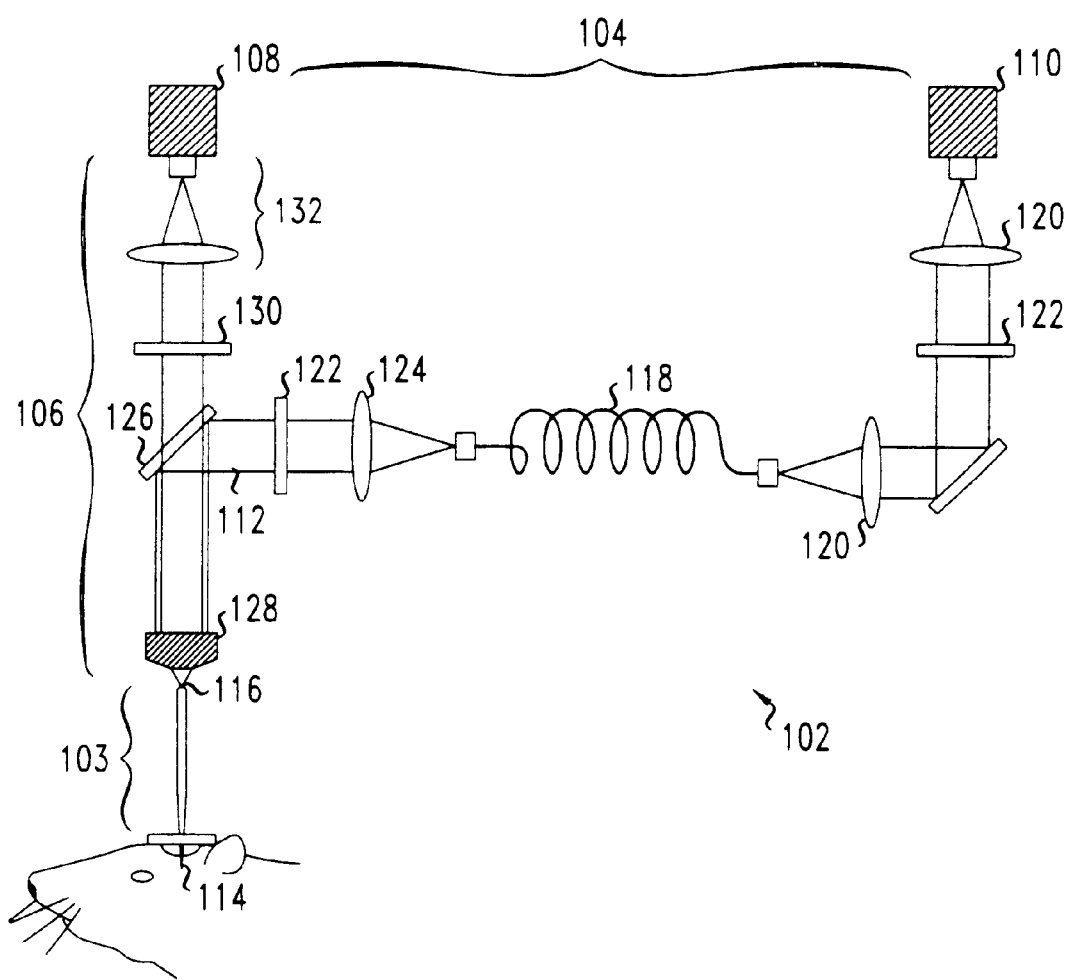
FIG. 7 shows an embodiment of a fluorescent microscope with a compound GRIN objective.

FIG. 7 shows a fluorescent optical microscope 102 that is based on a compound GRIN objective 103. Exemplary compound GRIN objectives 103 include the magnifying GRIN objective 30 of FIG. 2 and the non-magnifying GRIN objective 82 of FIG. 5. The fluorescent optical microscope 102 also includes illumination system 104, optical imaging system 106, and image recording system 108. The illumination system 104 includes a mercury arc lamp source 110 and a fiber-optic system that delivers monochromatic light 112 for illuminating a portion 114 of a sample. The imaging optics 106 produces a real magnified image in the image recording system 108 of a focused image produced from fluoresced sample light on a polished face 116 of compound GRIN objective 103.

The fiber-optic system delivers monochromatic light 112 that causes fluorescence in the portion 114 of the sample to be imaged. The fiber-optic system includes an optical delivery fiber 118, beam insertion optics 120, filters 122, and beam expansion optics 124. The beam expansion optics 124 directs the illumination light onto a dichroic mirror 126 that reflects light with the illumination wavelength to a movable focusing lens 128. The movable focusing lens 128 inserts the light into compound GRIN objective 103, which delivers the light to the portion 114 of the sample be imaged.

The optical imaging system 106 includes moveable focusing lens 128, dichroic mirror 126, filter 130, and focusing optics 132. In operation, the focusing lens 128 is positioned so that fluoresced sample light produces a focused image on the polished end 116 of the GRIN objective 104 and in the image recording system 108. The dichroic mirror 126 and filter 130 remove illumination light so that the image in the image recording system 108 is formed only from fluorescence light produced by the illuminated portion 114 of the sample.

Exemplary image recording systems 108 include photosensitive films and photosensitive detection layers of cameras.

Other embodiments will be apparent to those of skill in the art from the detailed description, figures, and the claims.

What is claimed is:

1. An optical microscope, comprising:
    a compound GRIN objective able to form an image of an object located near one end of the GRIN objective, the GRIN objective configured to, at least, limit a lateral field of view for the image to a distance equal to the diameter of the GRIN objective; and
    a lens system positioned to form a magnified image of an image formed by the compound GRIN objective.

2. The optical microscope of claim 1, wherein the GRIN objective further comprises:
    a first GRIN lens; and
    a second GRIN lens end-coupled to the first GRIN lens; and
    wherein the first GRIN lens has a length in an interval (0, ¼$P_1$] modulo a whole- or half-integer times $P_1$, the $P_1$ being a pitch of the first GRIN lens; and
    wherein the second GRIN lens has a pitch $P_2$, the value of $P_2$ being greater than the value of $P_1$.

3. The optical microscope of claim 2, wherein the second GRIN lens has a length of about ¼$P_2$ modulo a whole- or half-integer times $P_2$.

4. The optical microscope of claim 2, further comprising:
a third GRIN lens having pitch $P_3$ and having a length in interval $(0, \frac{1}{4}P_3]$ modulo a whole- or half-integer times $P_3$, the first and third GRIN lenses being coupled to opposite ends of the second GRIN lens.

5. The optical microscope of claim 2, further comprising:
a third GRIN lens having pitch $P_3$ and having a length in interval $(0, \frac{1}{4}P_3]$ modulo a whole- or half-integer times $P_3$, the first and third GRIN lenses being coupled to opposite ends of the second GRIN lens, and
wherein the second GRIN lens has a length of about $\frac{1}{2}P_2$ modulo a whole- or half-integer times $P_2$.

6. The optical microscope of claim 1, wherein the GRIN objective is capable of producing the focused image of the object with a magnification of more than one.

7. The optical microscope of claim 1, wherein the GRIN objective forms an endoscope that is at least 2 centimeters long.

8. An apparatus, comprising:
a lens system; and
a GRIN objective positioned to produce an image that the lens system is able to magnify, the GRIN objective further comprising:
first and second GRIN lenses that are end-coupled, the first and second GRIN lenses having respective pitches of $P_1$ and $P_2$, the value of $P_2$ being greater than the value of $P_1$, the first GRIN lens having a length in an interval $(0, \frac{1}{4}P_1]$ modulo a whole- or half-integer times $P_1$.

9. The apparatus of claim 8, wherein the second GRIN lens has a length of about $\frac{1}{4}P_2$ modulo a whole- or half-integer times $P_2$.

10. The apparatus of claim 8, wherein the GRIN objective forms an endoscope that is at least 2 centimeters long.

11. The apparatus of claim 8, wherein the second GRIN lens has a length of about $\frac{1}{2}P_2$ modulo an integer times $P_2$.

12. The apparatus of claim 8, wherein the first GRIN lens has a length of about $\frac{1}{4}P_1$.

13. The apparatus of claim 8, further comprising:
a fluorescent microscope, the lens system and GRIN objective belonging to respective objective and imaging lens systems of the fluorescent microscope; and
wherein the lens system includes a spherical lens and a dichroic object positioned to receive light from a spherical lens and to send light to a spherical lens.

14. The apparatus of claim 8, further comprising:
an optical scanner, the GRIN objective being positioned to transmit scan light to an object and to transmit light emitted by the object; and
an optical device to cause a scan light beam to move along a path on a face of the GRIN objective.

15. The apparatus of claim 8, further comprising:
a third GRIN lens having pitch $P_3$, and having a length in an interval $(0, \frac{1}{4}P_3]$ modulo a whole- or half-integer times $P_3$, the first and third GRIN lenses being coupled to opposite ends of the second GRIN lens.

16. The apparatus of claim 15, further comprising:
an optical scanner, the GRIN objective being positioned to transmit scan light to an object and to transmit light emitted by the object; and
a optical device to cause a scan light beam to move along a path on a face of the GRIN objective.

17. A method of forming an image, comprising:
positioning an end of a compound GRIN lens near a portion of a sample;
forming a focused and low distortion first image of the portion of the sample by transmitting light from the portion of the sample through the compound GRIN lens; and
sending light from the focused first image through an optical system to form a further magnified second image.

18. The method of claim 17, wherein the forming includes transmitting light from the portion of the sample first through a first GRIN lens segment and then through a second GRIN lens segment, the first segment having a shorter pitch than the second segment.

19. The method of claim 18, wherein the length of the first segment has a value in a range modulo a whole- or half-integer number times the pitch of the first segment, the range being 0 to $\frac{1}{4}$ times the pitch of the first segment.

20. The method of claim 19, wherein the length of the second segment has a value in a range modulo a whole- or half-integer number times the pitch of the second segment, the range being $\frac{1}{2}$ times the pitch of the second segment to $\frac{3}{4}$ times the pitch of the second segment.

* * * * *